(12) United States Patent
Asai et al.

(10) Patent No.: US 9,539,908 B2
(45) Date of Patent: Jan. 10, 2017

(54) CONTACTLESS POWER SUPPLY DEVICE

(71) Applicant: NISSAN MOTOR CO., LTD., Yokohama-shi, Kanagawa (JP)

(72) Inventors: Akihiro Asai, Atsugi (JP); Shigeyuki Yoshida, Yokohama (JP)

(73) Assignee: NISSAN MOTOR CO., LTD., Yokohama-Shi (JP)

(*) Notice: Subject to any disclaimer, the term of this patent is extended or adjusted under 35 U.S.C. 154(b) by 0 days.

(21) Appl. No.: 14/782,962

(22) PCT Filed: Mar. 20, 2014

(86) PCT No.: PCT/JP2014/057778
§ 371 (c)(1),
(2) Date: Oct. 7, 2015

(87) PCT Pub. No.: WO2014/167979
PCT Pub. Date: Oct. 16, 2014

(65) Prior Publication Data
US 2016/0052403 A1 Feb. 25, 2016

(30) Foreign Application Priority Data

Apr. 12, 2013 (JP) .................. 2013-083545

(51) Int. Cl.
*H02J 50/10* (2016.01)
*B60L 11/18* (2006.01)
(Continued)

(52) U.S. Cl.
CPC ............. *B60L 11/18* (2013.01); *B60L 3/0023* (2013.01); *B60L 11/182* (2013.01);
(Continued)

(58) Field of Classification Search
CPC .................................................. B60R 16/0207
(Continued)

(56) References Cited

U.S. PATENT DOCUMENTS 8,692,413 B2 4/2014 Sasaki et al.
8,970,060 B2 3/2015 Ichikawa et al.
(Continued)

FOREIGN PATENT DOCUMENTS

CN 102197566 A 9/2011
FR 2925406 A1 6/2009
(Continued)

OTHER PUBLICATIONS

Schrieber, H. et al., "Schriebers Stromkasten 104: Inductive charging is explored", Nov. 12, 2010, (with translation), 4 pages.
(Continued)

*Primary Examiner* — Rexford Barnie
*Assistant Examiner* — Thai Tran
(74) *Attorney, Agent, or Firm* — Foley & Lardner LLP

(57) ABSTRACT

A power receiving coil (22) is installed at a front portion on a lower surface of a floor panel (40) close to steered front wheels (W) and elongated across a lower open portion of a tunnel portion (42) located in the center of a vehicle (1). Therefore, the power receiving coil (22) can be accurately aligned with a power transmission coil (12) on the load surface side to face each other with a sense of steering in such a manner as to align the center of the vehicle with the power transmission coil (12) when the vehicle (1) advances to a predetermined stop position in a parking space (2).

3 Claims, 9 Drawing Sheets

(51) Int. Cl.
*H02J 17/00* (2006.01)
*B60L 3/00* (2006.01)
*H02J 5/00* (2016.01)
*B62D 25/20* (2006.01)

(52) U.S. Cl.
CPC ....... *B60L 11/1803* (2013.01); *B60L 11/1812* (2013.01); *B60L 11/1824* (2013.01); *B60L 11/1833* (2013.01); *B60L 11/1846* (2013.01); *B60L 11/1877* (2013.01); *H02J 5/005* (2013.01); *H02J 17/00* (2013.01); *H02J 50/10* (2016.02); *H02J 50/80* (2016.02); *B60L 2210/30* (2013.01); *B60L 2210/40* (2013.01); *B60L 2270/147* (2013.01); *B62D 25/20* (2013.01); *Y02T 10/705* (2013.01); *Y02T 10/7005* (2013.01); *Y02T 10/7072* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC .................................. 307/104; 180/60, 65.1
See application file for complete search history.

(56) References Cited

U.S. PATENT DOCUMENTS

| | | |
|---|---|---|
| 2007/0007060 A1 | 1/2007 | Ono et al. |
| 2011/0074346 A1 | 3/2011 | Hall et al. |
| 2011/0231029 A1 | 9/2011 | Ichikawa et al. |
| 2011/0254376 A1 | 10/2011 | Sasaki et al. |
| 2012/0018238 A1* | 1/2012 | Mizoguchi ............... B60K 1/04 180/68.5 |
| 2012/0025761 A1* | 2/2012 | Takada .................... H02J 5/005 320/108 |
| 2013/0193749 A1 | 8/2013 | Nakamura et al. |
| 2013/0300359 A1 | 11/2013 | Nakamura et al. |
| 2014/0196964 A1* | 7/2014 | Hayashi ................... B60K 6/28 180/65.21 |
| 2016/0082847 A1 | 3/2016 | Asai |

FOREIGN PATENT DOCUMENTS

| | | | |
|---|---|---|---|
| JP | 07322447 A | * | 12/1995 |
| JP | 10-109548 A | | 4/1998 |
| JP | 2011-006052 A | | 1/2011 |
| JP | 2011-217452 A | | 10/2011 |
| JP | 2012-240477 A | | 12/2012 |
| KR | 10-2011-0060207 A | | 6/2011 |
| KR | 10-2011-0066945 A | | 6/2011 |
| WO | WO-2005/102759 A1 | | 11/2005 |
| WO | WO 2010/136861 A1 | | 12/2010 |
| WO | WO-2011/116394 A1 | | 9/2011 |
| WO | WO 2012/105040 A1 | | 8/2012 |

OTHER PUBLICATIONS

Asai, A., U.S. Appl. No. 14/783,843, dated Jun. 16, 2016, 18 pages.
Uspto Office Action, 14/783,843 (040302-1128), dated 11-18-16, 17 pp.

* cited by examiner

CONTACTLESS POWER SUPPLY DEVICE

TECHNICAL FIELD

The present invention relates to contactless power supply devices for supplying electric power to vehicles such as electric vehicles without contact.

BACKGROUND ART

Patent Document 1 discloses a system for charging a battery mounted on a lower surface of a floor panel, the system including a primary coil placed in a movable manner on a road surface and a secondary coil installed at a front portion on a lower surface of a vehicle toward one side in a vehicle width direction and facing the primary coil so as to supply electric power from the primary coil to the secondary coil by electromagnetic induction.

CITATION LIST

Patent Document

Patent Document 1: Japanese Unexamined Patent Application Publication No. 2011-217452

SUMMARY OF INVENTION

The system disclosed in Patent Document 1 is in fact complicated because the system requires a driving device for the primary coil and other drive control means including several types of detection means.

The present invention provides a contactless power supply device capable of accurately aligning a power receiving portion on a vehicle side with a power supply portion on a road surface side so as to face each other with a sense of steering in such a manner as to park the vehicle at a predetermined stop position in a parking space.

A contactless power supply device according to the present invention includes a power supply portion located in a parking space and a power receiving portion installed on a lower surface of a floor panel of a vehicle so as to supply electric power to the vehicle without contact through magnetic connection between the power supply portion and the power receiving portion.

The floor panel includes, in a middle portion thereof in a vehicle width direction, a tunnel portion protruding toward an interior room and extending in a vehicle front-rear direction, and the power receiving portion includes a junction box on an upper surface thereof.

The power receiving portion is placed at a front portion on the lower surface of the floor panel and elongated across a lower open portion of the tunnel portion, and the junction box is arranged inside the tunnel portion.

DESCRIPTION OF EMBODIMENTS

Hereinafter, an embodiment of the present invention will be explained in detail with reference to the drawings.

Figure 1:
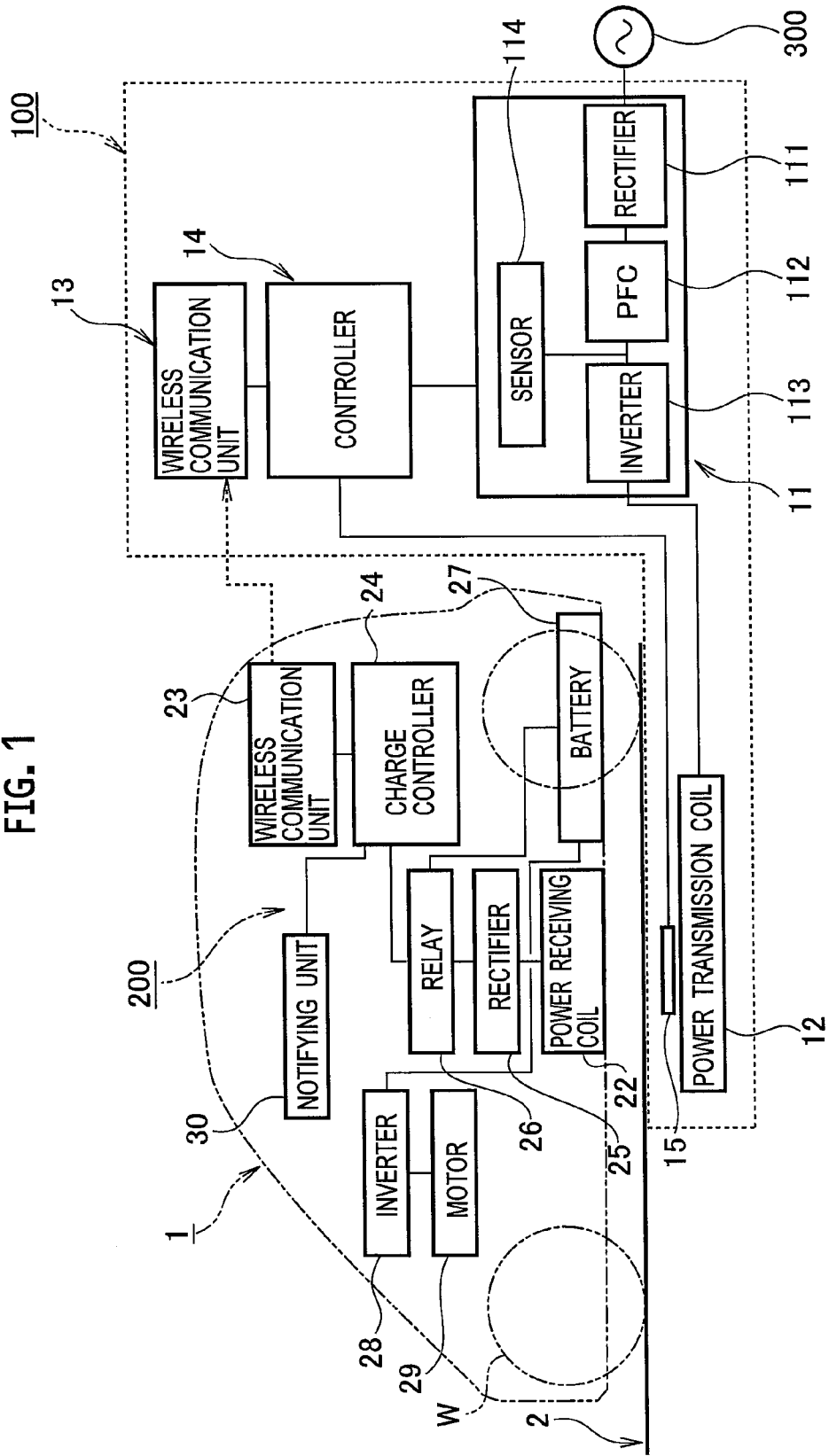
FIG. 1 is an explanatory view schematically showing a contactless power supply device according to the present invention.

A contactless power supply device according to the present invention shown in FIG. 1 includes a power supply device 100 as a ground-side unit and a power receiving device 200 as a vehicle-side unit. The contactless power supply device supplies electric power, without contact, from the power supply device 100 located at a power supply stand or the like to the power receiving device 200 installed in a vehicle 1 represented by an electric vehicle or a hybrid vehicle so as to charge a battery 27 mounted on the vehicle 1.

The power supply device 100 includes a power supply portion 12 placed in a parking space 2 adjacent to the power supply stand. The power receiving device 200 includes a power receiving portion 22 placed on a bottom surface of the vehicle 1 in such a manner as to face the power supply portion 12 when the vehicle 1 is parked at a predetermined position in the parking space 2.

A power transmission coil mainly composed of a primary coil made of an electrically conductive wire may be used as the power supply portion 12. Similarly, a power receiving coil mainly composed of a secondary coil made of an electrically conductive wire may be used as the power receiving portion 22. Electric power can be supplied from the power transmission coil 12 to the power receiving coil 22 without contact by electromagnetic induction between the two coils.

The power supply device 100 on the ground side includes a power controller 11, the power transmission coil 12, a wireless communication unit 13, and a controller 14.

The power controller 11 converts AC power transmitted from an AC power source 300 to high-frequency AC power to transmit the converted power to the power transmission coil 12. The power controller 11 includes a rectifier 111, a power factor correction (PFC) circuit 112, an inverter 113, and a sensor 114. The rectifier 111 is a circuit electrically connected to the AC power source 300 to rectify the AC power output from the AC power source 300. The PFC circuit 112 corrects power factor by shaping waveforms output from the rectifier 111 and is connected between the rectifier 111 and the inverter 113.

The wireless communication unit 13 communicates with a wireless communication unit 23 provided on the vehicle 1.

The controller 14 controls the entire power supply device 100. The controller 14 transmits a signal toward the vehicle 1 that the power supply device 100 starts supplying electric power, or receives a signal from the vehicle 1 that power supply from the power supply device 100 is requested, through the communication between the two wireless communication units 13 and 23.

The controller 14 further performs switching control on the inverter 113 depending on current detected by the sensor 114 so as to regulate electric power transmitted from the power transmission coil 12. In addition, the controller 14 stops power supply based on a detection signal from a foreign object sensor 15 during power supply or transmits a warning signal toward the vehicle 1 via the wireless communication units 13 and 23.

For example, a metal detection coil is used as the foreign object sensor 15. When metal foreign objects enter or exist in a magnetic field formed between the power transmission coil 12 and the power receiving coil 22 during power supply, the controller 14 immediately warns against or stops supplying electric power according to an electric detection signal from the foreign object sensor 15, so as to prevent a fault such as failure in power supply derived from the presence of the metal foreign objects in the magnetic field.

The power receiving device 200 on the vehicle 1 side includes the power receiving coil 22, the wireless communication unit 23, a charge controller 24, a rectifier 25, a relay 26, the battery 27, an inverter 28, a motor 29, and a notifying unit 30.

The power receiving coil 22 is located immediately above the power transmission coil 12 to face each other when the vehicle 1 is parked at a predetermined stop position in the parking space 2 as described below and kept separate from the power transmission coil 12.

The rectifier 25 is a rectifying circuit connected to the power receiving coil 22 to rectify AC power received by the power receiving coil 22 to DC power.

The relay 26 includes a relay switch turned on/off based on the control by the charge controller 24. The relay 26 separates a main circuit system including the battery 27 from the power receiving portion 22 and the rectifier 25 serving as a circuit for charging when the relay switch is turned off.

The battery 27 includes a plurality of secondary batteries connected to each other and serves as a power source of the vehicle 1. The inverter 28 is, for example, a PWM control circuit having a switching device such as an IGBT and converts DC power output from the battery 27 to AC power to supply it to the motor 29 according to a switching control signal. The motor 29 is, for example, a three-phase AC motor serving as a drive power source for driving the vehicle 1.

The notifying unit 30 includes a warning lamp, a display of a navigation system or a speaker and outputs light, images or sounds to a user based on the control of the charge controller 24.

The charge controller 24 regulates charge of the battery 27 and controls the wireless communication unit 23, the notifying unit 30, the relay 26 and the like. The charge controller 24 transmits a signal to start charging the battery 27 to the controller 14 through the communication between the two wireless communication units 23 and 13. The charge controller 24 is connected to a controller (not shown in the figure) for controlling the entire vehicle 1 via a CAN communication network. This controller manages the switching control of the inverter 28 and the state of charge (SOC) of the battery 27. When the SOC of the battery 27 reaches full charge according to the controller, the charge controller 24 transmits a signal to stop charging the battery 27 to the controller 14.

The contactless power supply device according to the present embodiment transmits and receives high-frequency power between the power transmission coil 12 and the power receiving coil 22 without contact by electromagnetic induction. In other words, once voltage is applied to the power transmission coil 12, magnetic connection is caused between the power transmission coil 12 and the power receiving coil 22 so as to supply electric power from the power transmission coil 12 to the power receiving coil 22.

Here, surfaces of protection casings of the respective power transmission coil 12 and power receiving coil 22 facing each other serve as electromagnetic induction areas and are formed of a synthetic resin material in order not to obstruct the electromagnetic induction therebetween.

FIG. 2 to FIG. 10 each show an installation state of the power receiving coil 22 and the battery 27 on the vehicle 1.

The power receiving coil 22 and the battery 27 are both installed on the lower surface of a floor panel 40 of the vehicle 1.

The power receiving coil 22 is installed at a front end on the lower surface of the floor panel 40 and in the middle in the vehicle width direction. The battery 27 is installed to cover a wide area from around the rear side of the installed position of the power receiving coil 22 toward the rear of the vehicle 1.

The floor panel 40 is connected to a dash panel 41 located at the front end thereof to separate a front compartment 1F from an interior room 1R. The floor panel 40 includes, in the middle thereof in the vehicle width direction (in the center of the vehicle), a tunnel portion 42 protruding toward the interior room 1R and extending in the vehicle front-rear direction (refer to FIG. 2 and FIG. 3).

The tunnel portion 42 is provided with reinforcements 43 having a closed cross section extending along the base of protrusion in the vehicle front-rear direction on both sides of the tunnel portion 42.

Figure 2:
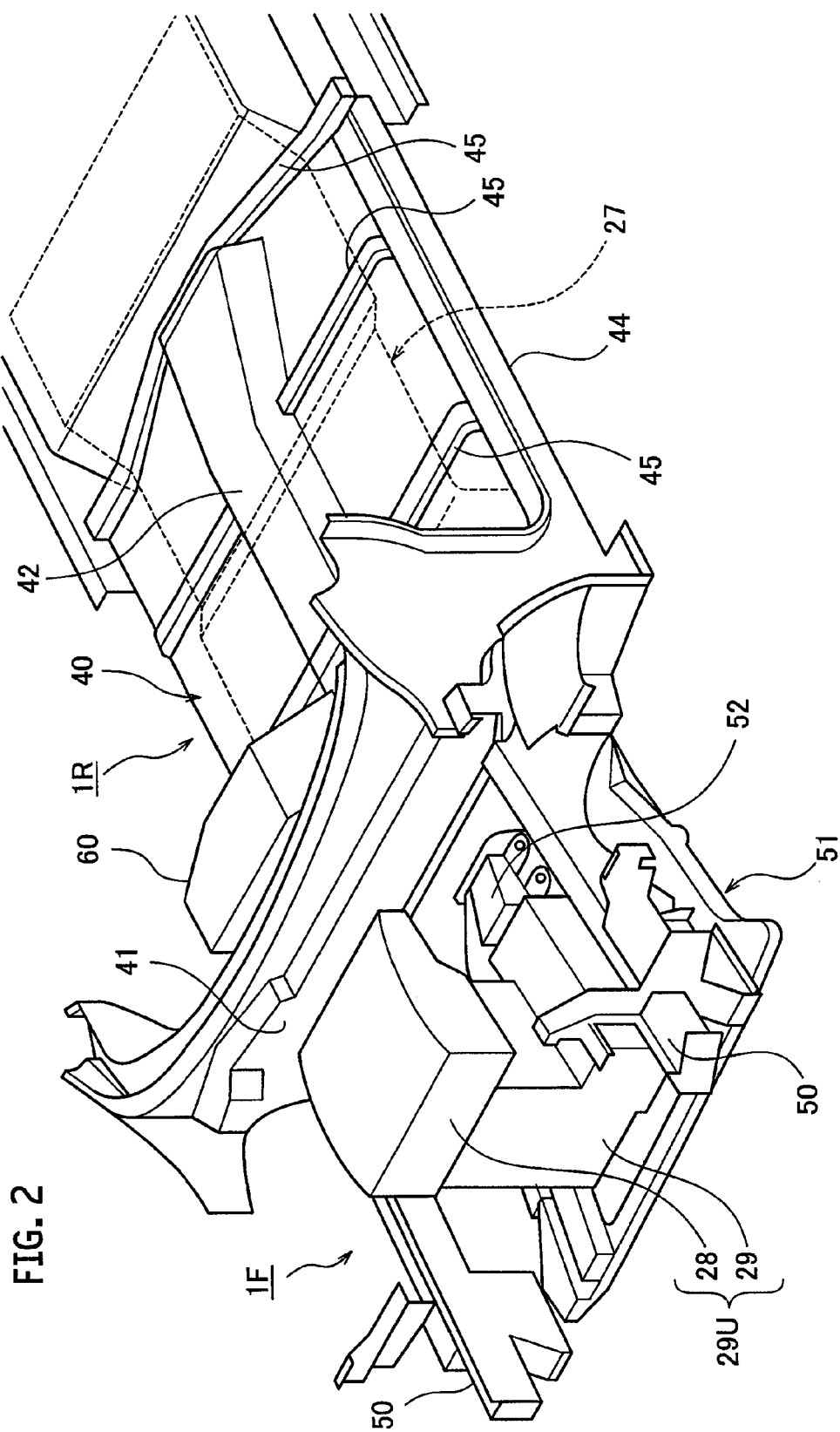
FIG. 2 is an explanatory perspective view showing an installation layout of a battery, a motor unit and a room accessory.
Figure 3:
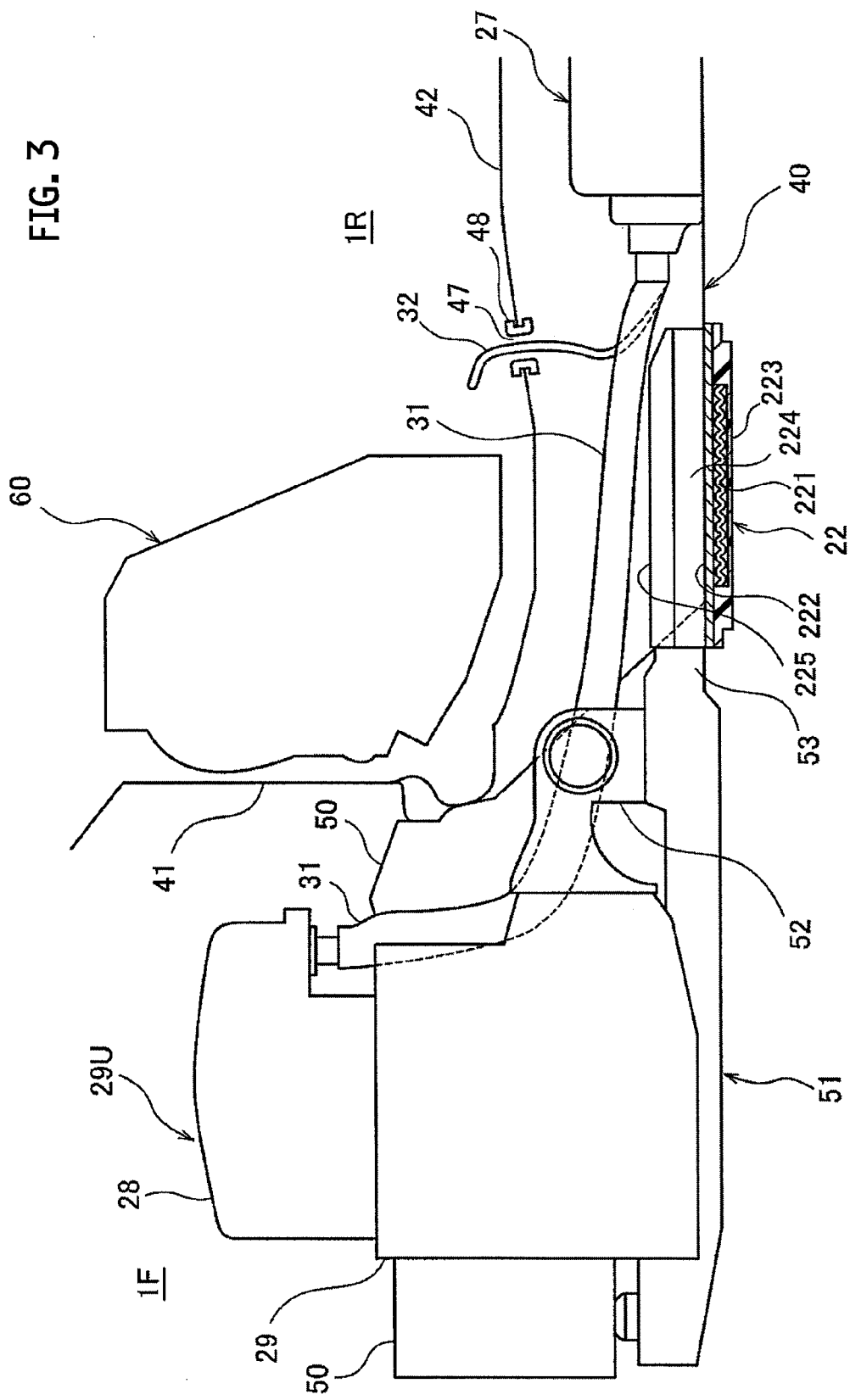
FIG. 3 is an explanatory cross-sectional view of FIG. 2 in a vehicle front-rear direction showing a central portion of a vehicle.
Figure 4:
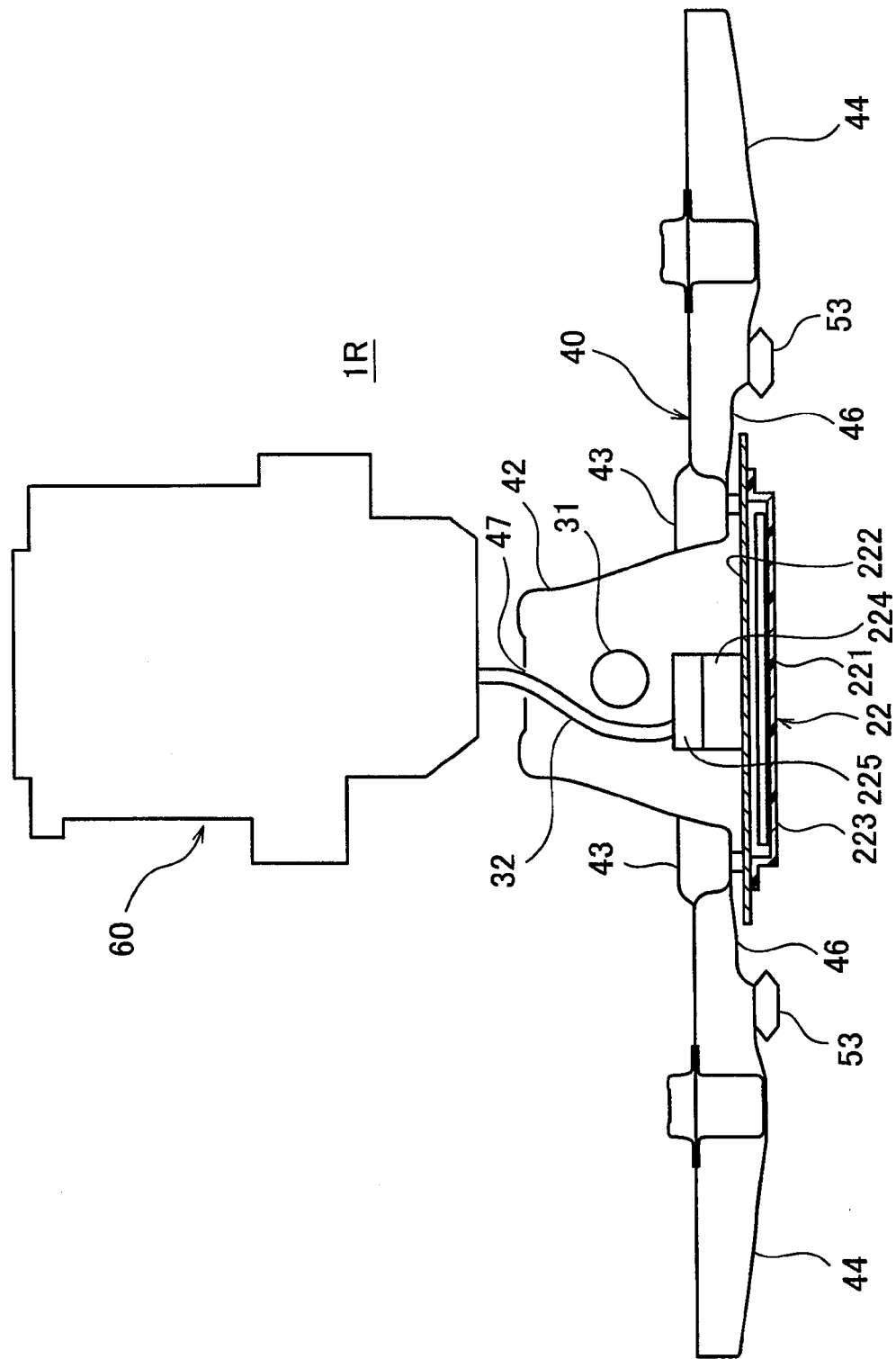
FIG. 4 is an explanatory cross-sectional view of FIG. 2 in a vehicle width direction at a position where a power receiving portion is installed.
Figure 5:
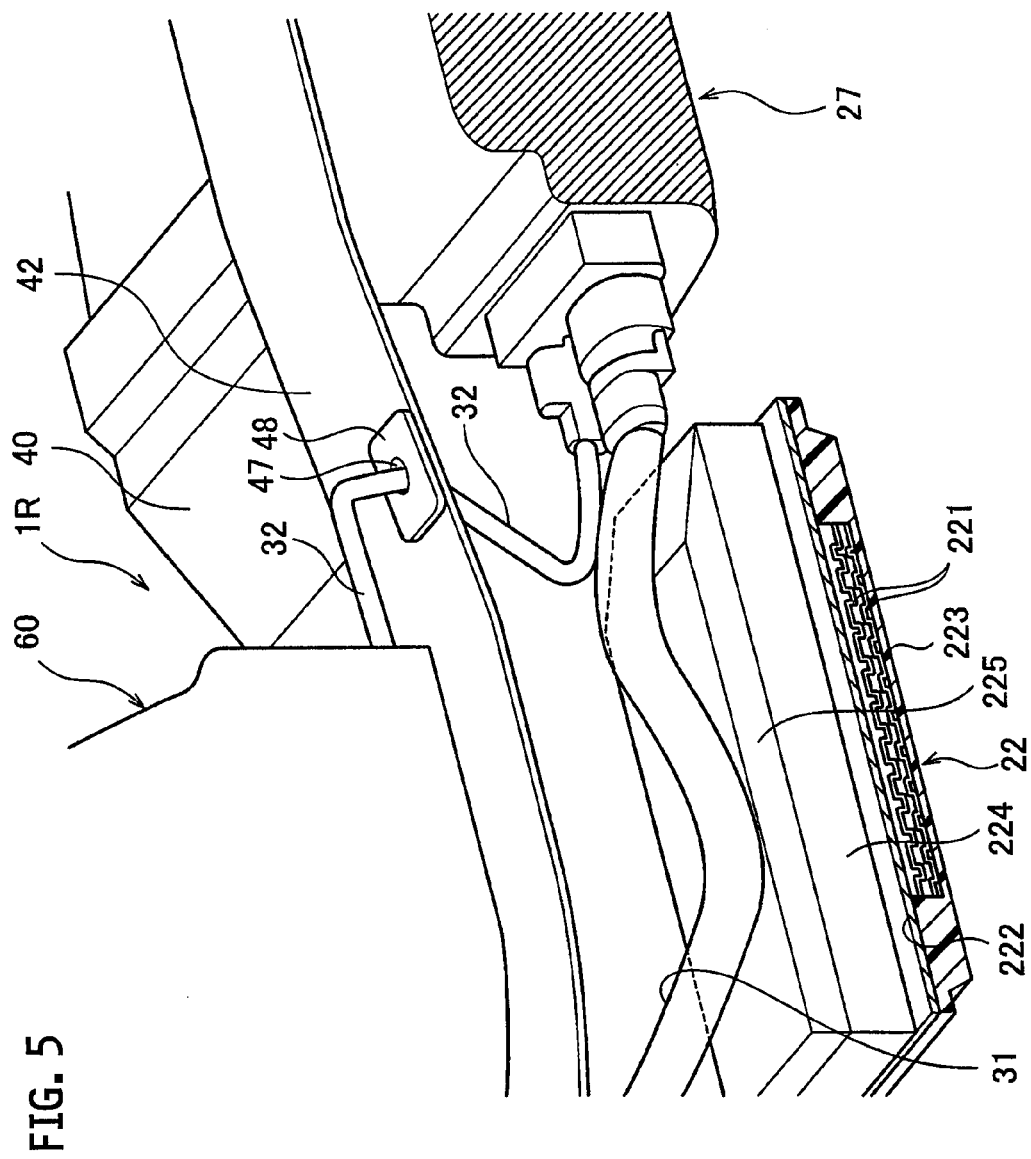
FIG. 5 is an explanatory cross-sectional perspective view showing the power receiving portion arranged in a tunnel portion.
Figure 6:
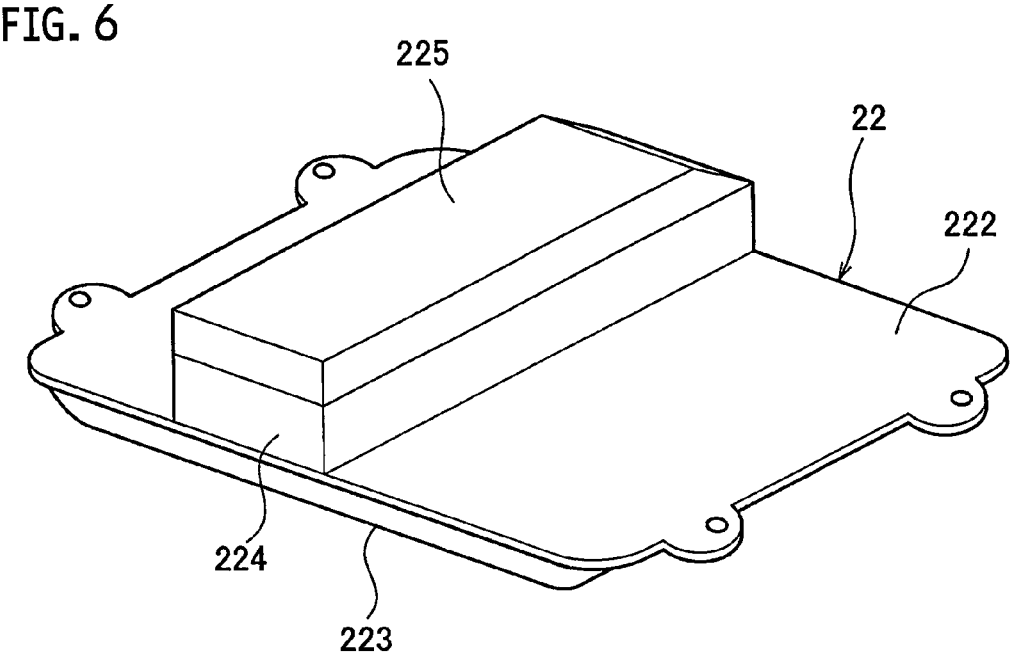
FIG. 6 is a perspective view of the power receiving portion.

The floor panel 40 ensures necessary floor rigidity due to floor frame members including the tunnel portion 42 and the reinforcements 43 thereof, side sills 44 located on both sides in the vehicle width direction and extending in the vehicle front-rear direction, a plurality of cross members 45 extending in the vehicle width direction, and outriggers 46 located on the floor front side to connect the reinforcements 43 and the side sills 44 adjacent thereto (refer to FIG. 2 to FIG. 4).

The large and heavy battery 27 is thus rigidly fixed to the main frame members such as the side sills 44 and the cross members 45 and to the reinforcements 43 of the tunnel portion 42.

The power receiving coil 22 is elongated across a lower open portion of the tunnel portion 42 and connected thereto at the installed position described above, namely on the lower surface at the front end of the floor panel 40 and in the middle in the vehicle width direction (refer to FIG. 4).

The power receiving coil 22 has a width W2 in the vehicle width direction set to be larger than a width W1 of the lower open portion of the tunnel portion 42 (W1<W2). As shown in FIGS. 9(A) and 9(B), the power receiving coil 22 is elongated across the reinforcements 43, 43 of the lower open portion of the tunnel portion 42 or across the outriggers 46, 46 and connected thereto.

The power receiving coil 22 is formed into a square plate shape and includes a coil body 221 for receiving electric power, a protection casing 222 formed of nonmagnetic metal such as aluminum and housing the coil body 221 fixed thereto, and a lid 223 blocking the lower open portion of the protection casing 222. The lid 223 is formed of an appropriate synthetic resin material because of the reason described above in order not to obstruct the electromagnetic induction between the power transmission coil 12 and the power receiving coil 22 (refer to FIG. 5 and FIG. 6).

The protection casing 222 is provided, in the middle on the upper surface thereof, with a junction box 225 housing a switchboard (a distribution device), a relay (the relay 26) and a controller (the charge controller 24). In the examples shown in FIG. 5 and FIG. 6, an electrical box 224 housing electrical components such as a rectifier (the rectifier 25) and a capacitor is provided in the middle on the upper surface of the protection casing 222. The junction box 225 is formed separately from the electrical box 224 in such a manner as to have the same size on a projection plane and is removably attached on the electrical box 224.

The electrical box 224 is formed integrally with the protection casing 222 and is separated inside thereof from the storage portion of the coil body 221 by a partition plate. However, the electrical box 224 may be formed separately from the protection casing 222.

The front compartment 1F is provided, on both sides in the vehicle width direction, with front side members 50 serving as frame members at a front portion of the vehicle body and extending in the vehicle front-rear direction with rear ends thereof connected to the dash panel 41.

The front compartment 1F is provided with a sub frame 51 on the lower side thereof, on which a motor unit 29U including the inverter 28 and the motor 29 described above is mounted and fixed via a mount member 52.

The sub frame 51 is formed substantially into a rectangular shape in a plan view, and front and rear ends thereof on both sides in the vehicle width direction are connected to lower surfaces at front and rear ends of the right and left front side members 50 so as to serve as frame members of the vehicle body on the lower side of the front compartment 1F.

Figure 7:
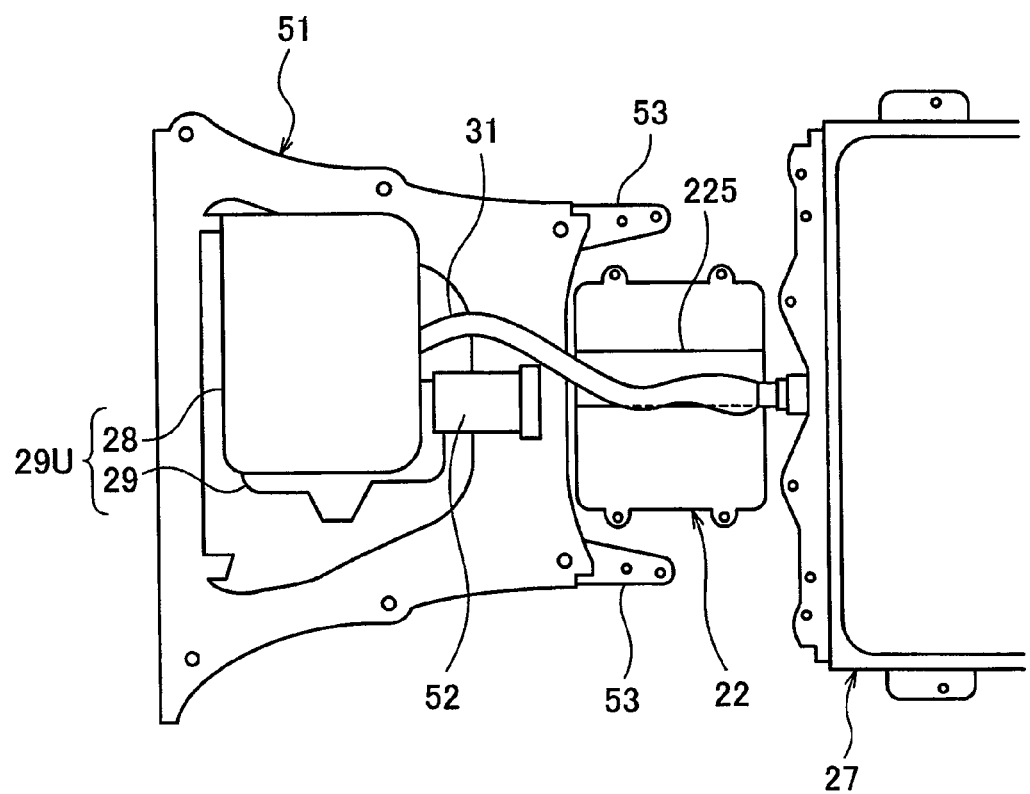
FIG. 7 is an explanatory plan view showing the installation layout of the battery, the power receiving portion and the motor unit.
Figure 8:
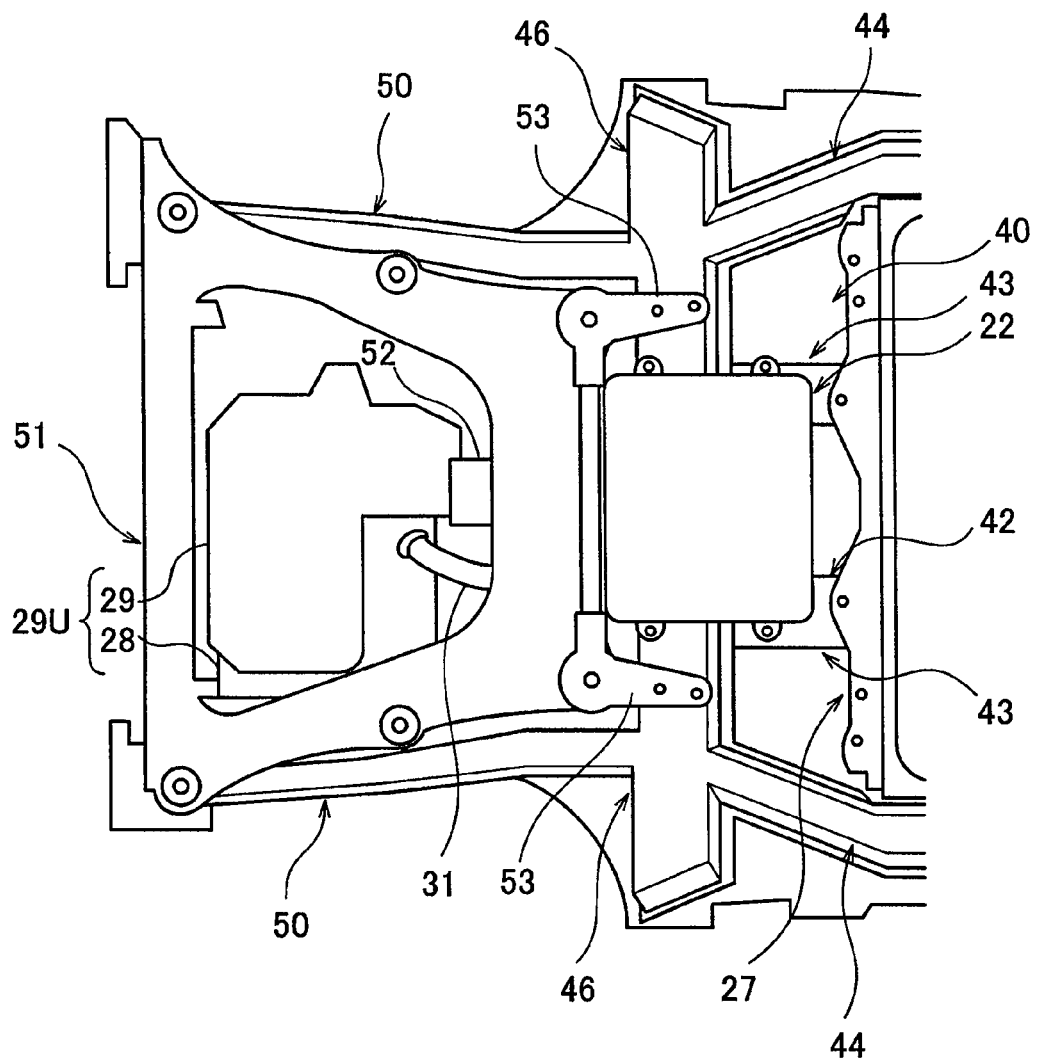
FIG. 8 is an explanatory bottom view of the installation layout of FIG. 7 as viewed from the bottom of the vehicle.
Figure 9:
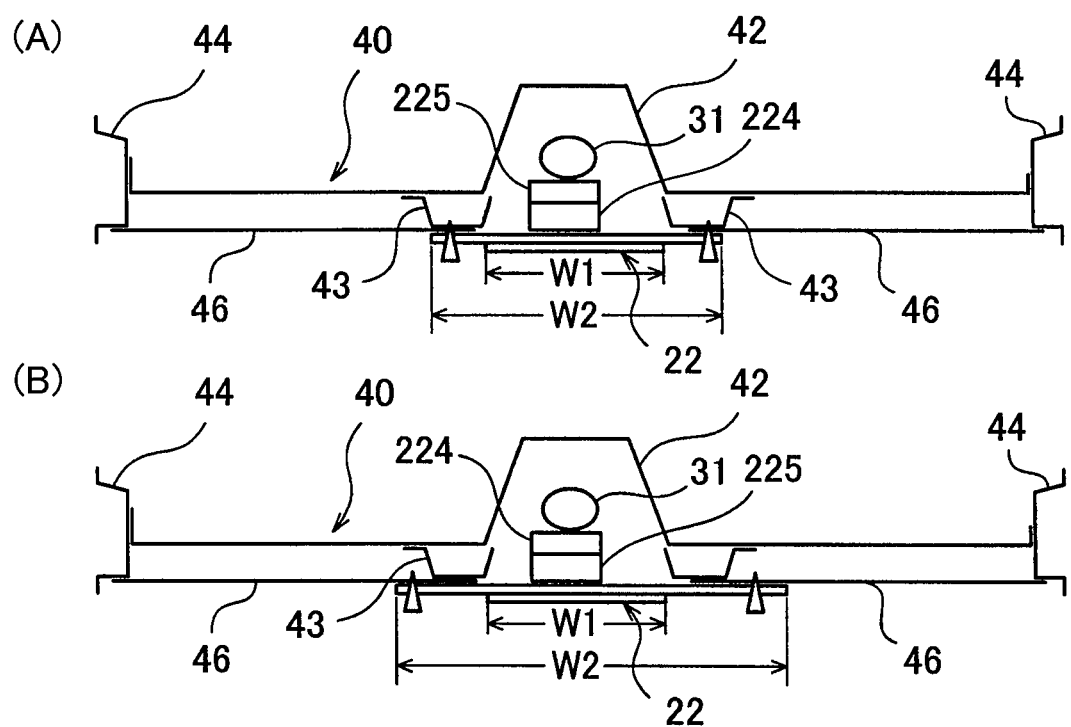
FIG. 9 is an explanatory cross-sectional view of installation examples (A) and (B) of the power receiving portion.

The sub frame 51 includes extensions 53 at the rear end thereof extending toward the rear of the vehicle on both sides of the power receiving coil 22 in the vehicle width direction to reinforce the portions to which the power receiving coil 22 is fixed (refer to FIG. 7 and FIG. 8). In the examples shown in the figures, the extensions 53 are formed separately from the sub frame 51 in such a manner as to have base portions elongated in the vehicle width direction and extending portions extending from the base portions on both sides toward the rear of the vehicle. The base portions are fastened together with the rear end of the sub frame 51, and the rear ends of the extensions 53 are connected to the outriggers 46. However, the extensions 53 may be formed integrally with the sub frame 51.

In the installation layout including the battery 27, the power receiving coil 22 and the motor unit 29U aligned in line in the vehicle front-rear direction, a high-current system wire harness 31 is connected to each of the front end of the battery 27 and the rear end of the motor unit 29U (the rear end of the inverter 28) with connectors so as to transmit electric power from the battery 27 to the motor unit 29U. The wire harness 31 passes above the power receiving coil 22 and is arranged along the inside of the tunnel portion 42.

The wire harness 31 is arranged above the junction box 225 but may be arranged on one side of the junction box 225 as necessary. In such a case, the electrical box 224 and the junction box 225 may be shifted toward either side from the central position of the tunnel portion 42 so as to ensure a wiring space for the wire harness 31 having a large diameter.

The top wall of the tunnel portion 42 is provided, adjacent to the junction box 225, with a through-hole 47 into which a high-current system wire harness 32 is inserted for transmitting electric power from the battery 27 or the junction box 225 to a room accessory 60 such as an air conditioning unit installed inside the interior room 1R. A grommet 48 is fitted into the through-hole 47 to seal the circumference of the wire harness 32 inserted thereinto.

Figure 10:
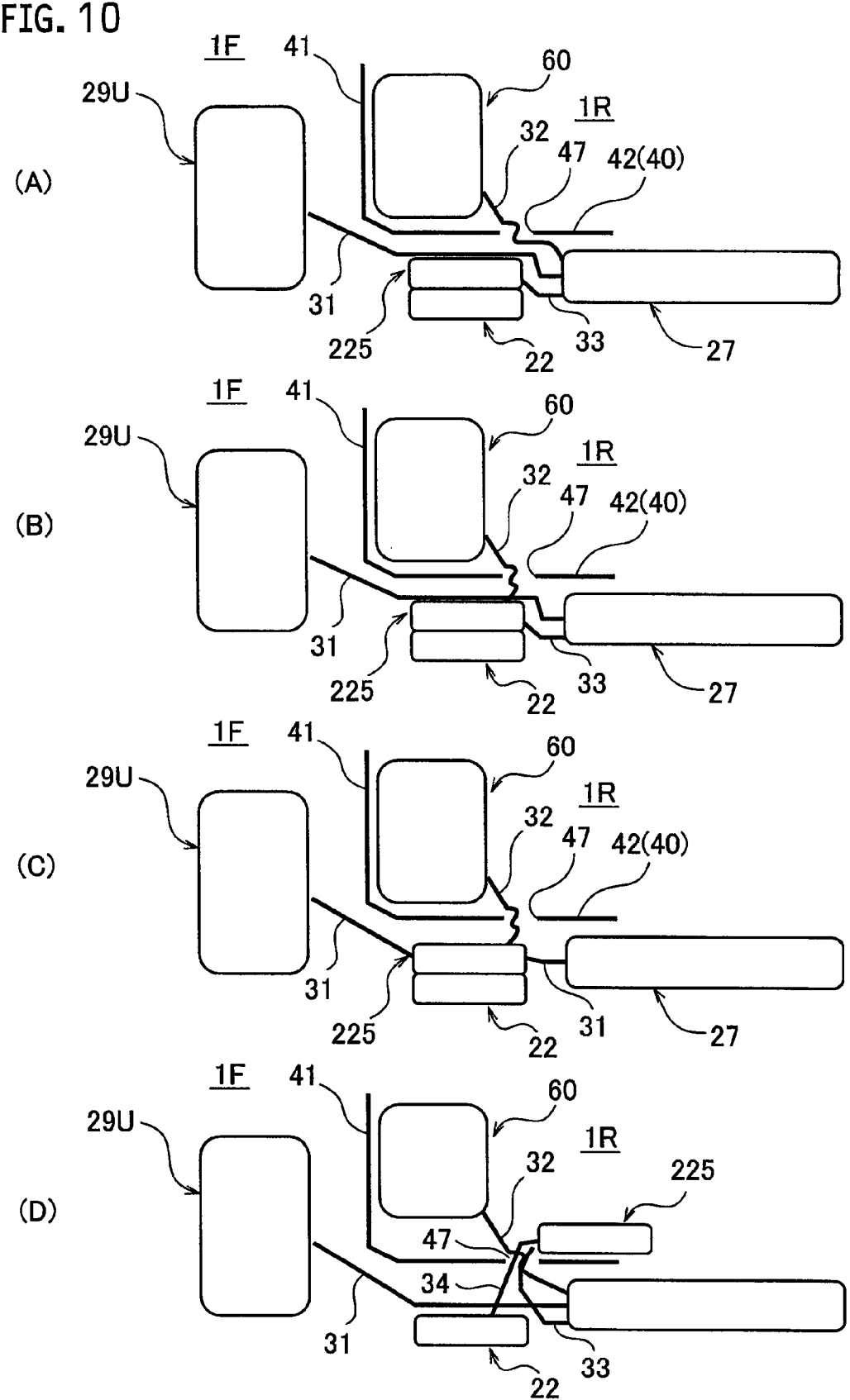
FIG. 10 is an explanatory schematic view of wiring pattern examples (A), (B), (C) and (D) of the battery.

FIG. 10 shows examples (A) to (D) of different wiring patterns for power transmission from the battery 27 to the motor unit 29U and the room accessory 60.

FIG. 10(A) shows an example in which the battery 27 is connected to the motor unit 29U, the room accessory 60 and the junction box 225 with the respective wire harnesses 31, 32 and 33.

FIG. 10(B) shows an example in which the wire harness 32 shown in FIG. 10(A) is distributed from the junction box 225 and connected to the room accessory 60, which decreases one wire extending from the battery 27.

FIG. 10(C) shows an example in which the wire harness 31 shown in FIG. 10(B) is distributed from the junction box 225 and connected to the motor unit 29U so as to omit the wire harness 33, which decreases two wires extending from the battery 27.

FIG. 10(D) shows an example in which the junction box 225 is separated from the power receiving coil 22 and installed in the interior room so as to increase the space inside the tunnel portion 42. The wire harness 33 shown in FIG. 10(A) and a wire harness 34 connecting the power receiving coil 22 and the junction box 225 are inserted into the above-described through-hole 47 together with the wire harness 32.

According to the contactless power supply device of the present embodiment having the configuration described above, the power receiving coil 22 is installed in the middle in the vehicle width direction at the front end on the lower surface of the floor panel 40 close to the front wheels W to be steered. Therefore, the vehicle 1 is only required to be steered in such a manner as to align the center thereof with the power transmission coil 12 on the road surface side when the vehicle 1 is parked at a predetermined stop position in the parking space 2 so as to accurately align the power receiving coil 22 with the power transmission coil 12 to face each other with a sense of steering the vehicle 1. In addition, since the power receiving coil 22 is located close to the front wheels W to be steered, a fine adjustment to the position of the power transmission coil 12 can be made so that the power receiving coil 22 can be aligned with the power transmission coil 12 to face each other more accurately.

Accordingly, a dedicated drive control system for the power transmission coil 12 having a movable configuration using a driving mechanism is not required for the accurate alignment described above. As a result, the power receiving coil 22 can be aligned with the power transmission coil 12 to face each other with a simple driving operation of the vehicle 1 while providing a cost advantage.

Further, the power receiving coil 22 covers the lower side of the high-current system wire harness 31 for transmitting electric power from the battery 27 located on the lower surface of the floor panel 40 to the motor unit 29U in the front compartment 1F so that the power receiving coil 22 serves as a protector to improve the safety of the wire harness 31.

Moreover, the power receiving coil 22 is located in the center of the vehicle with the installation layout including the battery 27, the power receiving coil 22 and the motor unit 29U aligned in line in the vehicle front-rear direction, and the wire harness 31 is arranged and passes straight above the power receiving coil 22 in a plan view so as to decrease the length of the wire harness 31.

The floor panel 40 described above includes the tunnel portion 42 in the center of the vehicle (in the middle in the vehicle width direction). The power receiving coil 22 described above is elongated across the lower open portion of the tunnel portion 42, and the wire harness 31 is arranged along the inside of the tunnel portion 42.

The power receiving coil 22 has a square plate-shaped rigid-body structure housing the coil body 221 between the protection casing 222 formed of metal and the lid 223 formed of synthetic resin so as to increase the rigidity of the lower open portion of the tunnel portion 42 to prevent stretch deformation (opening extension). Furthermore, the wire harness 31 can be stored in the closed cross section defined by the power receiving coil 22 and the tunnel portion 42 so as to further improve the safety of the wire harness 31.

The power receiving coil 22 includes the junction box 225 on the upper surface thereof. Since the power receiving coil 22 is elongated across the lower open portion of the tunnel portion 42 as described above, the junction box 225 is located inside the tunnel portion 42 so that the safety of the junction box 225 can be improved.

Since the junction box 225 projecting on the upper surface of the power receiving coil 22 is located inside the tunnel portion 42, an upward increase in height of the floor panel 40 can be prevent so as to favorably design the vehicle body.

The junction box 225 is formed separately from the power receiving coil 22 and removably attached on the upper surface of the power receiving coil 22. Therefore, the junction box 225 may be removed therefrom and installed inside the interior room as shown in FIG. 10(D) depending on specifications. Particularly, in specifications of a hybrid vehicle, such an installation allows a longitudinal arrangement of an exhaust gas tube inside the tunnel portion 42 so as to share the lower structure of the vehicle body.

Since the tunnel portion 42 is provided with the through-hole 47 on the top wall thereof, the wire harness 32 or the like passes therethrough so as to connect the battery 27 or the junction box 225 to the room accessory 60 installed in the interior room 1R with the shortest distance therebetween, which expands the possibility of the wiring layout.

The tunnel portion 42 is provided with the reinforcements 43 having a closed cross section extending along the base of protrusion in the vehicle front-rear direction on both sides of the tunnel portion 42. Since the power receiving coil 22 is elongated across these reinforcements 43, both the attachment rigidity of the power receiving coil 22 and the rigidity of the lower open portion of the tunnel portion 42 in the vehicle width direction can be improved.

The power receiving coil 22 has the width W2 in the vehicle width direction set to be larger than the width W1 of the lower open portion of the tunnel portion 42 and is directly connected to the reinforcements 43 located on both sides of the lower open portion. Therefore, the attachment rigidity and the rigidity in the vehicle width direction described above can be further improved.

The motor unit 29U is installed on the sub frame 51 serving as a frame member located on the lower side of the front compartment 1F. The sub frame 51 includes the extensions 53 at the rear end thereof extending on both sides of the power receiving coil 22 in the vehicle width direction toward the rear of the vehicle to reinforce the portions to which the power receiving coil 22 is fixed.

The effect due to the extensions 53 to reinforce the portions to which the power receiving coil 22 is fixed can increase the attachment rigidity of the power receiving coil 22 against vibration input acting on the fixed portions caused by vibrations during driving and the like. In addition, the front side and both right and left sides of the power receiving coil 22 can be protected by the rear end of the sub frame 51 and the extensions 53 located on both sides thereof, and the rear side of the power receiving coil 22 can be protected by the battery 27.

Accordingly, the power receiving coil 22 can be preserved from interference from road surfaces or the like and at the same time, the effect of protecting the above-described wire harness 31 arranged above the power receiving coil 22 can be increased.

Although the embodiment described above exemplified the case where the width W2 of the power receiving coil 22 in the vehicle width direction and the width W1 of the lower open portion of the tunnel portion 42 satisfy the relationship of W1<W2, the relationship may be changed to W1>W2 depending on vehicle specifications. In such a case, the power receiving coil 22 may be elongated across the lower open portion of the tunnel portion 42 and connected thereto via brackets.

The entire content of Japanese Patent Application No. P2013-083545 (filed on Apr. 12, 2013) is incorporated herein by reference.

Although the present invention has been described above by reference to the embodiment, the present invention is not limited to the descriptions thereof, and it will be apparent to those skilled in the art that various modifications and improvements can be made.

INDUSTRIAL APPLICABILITY

According to the present invention, the power receiving portion is installed at the front portion on the lower surface of the floor panel close to the steered front wheels and elongated across the lower open portion of the tunnel portion located in the center of the vehicle. Therefore, the power receiving portion can be accurately aligned with the power supply portion to face each other with a sense of steering in such a manner as to align the center of the vehicle with the power supply portion on the load surface side when the vehicle is parked at a predetermined stop position in the parking space.

Moreover, the junction box placed on the upper surface of the power receiving portion is arranged inside the tunnel portion so as to be stored in the closed cross section defined by the power receiving portion and the tunnel portion. Therefore, the safety of the junction box can be improved.

REFERENCE SIGNS LIST

1 VEHICLE
1F FRONT COMPARTMENT
1R INTERIOR ROOM
12 POWER TRANSMISSION COIL (POWER SUPPLY PORTION)
22 POWER RECEIVING COIL (POWER RECEIVING PORTION)
27 BATTERY
29U MOTOR UNIT
31, 32, 33, 34 WIRE HARNESS
42 TUNNEL PORTION
43 REINFORCEMENT WITH CLOSED CROSS SECTION OF TUNNEL PORTION
47 THROUGH-HOLE ON TOP WALL OF TUNNEL PORTION
51 SUB FRAME
53 EXTENSION
60 ROOM ACCESSORY

221 COIL BODY OF POWER RECEIVING COIL
222 PROTECTION CASING OF POWER RECEIVING COIL
223 LID OF POWER RECEIVING COIL
224 ELECTRICAL BOX OF POWER RECEIVING COIL
225 JUNCTION BOX

The invention claimed is:

1. A contactless power supply device comprising a power supply portion located in a parking space and a power receiving portion installed on a lower surface of a floor panel of a vehicle so as to supply electric power to the vehicle without contact through magnetic connection between the power supply portion and the power receiving portion,
the floor panel including, in a middle portion thereof in a vehicle width direction, a tunnel portion protruding toward an interior room and extending in a vehicle front-rear direction,
the power receiving portion including a junction box on an upper surface thereof,
the power receiving portion being placed at a front portion on the lower surface of the floor panel and elongated across a lower open portion of the tunnel portion,
the junction box being arranged inside the tunnel portion.

2. The contactless power supply device according to claim 1, wherein the tunnel portion includes a through-hole on a top wall thereof into which a wire harness is inserted to transmit electric power therethrough from a battery installed on the lower surface of the floor panel or the junction box to a room accessory installed in the interior room.

3. The contactless power supply device according to claim 1, wherein a wire harness for transmitting electric power from a battery installed on the lower surface of the floor panel to a motor unit installed in a front compartment of the vehicle passes above the power receiving portion and is arranged along an inner side of the tunnel portion in the vehicle front-rear direction.

* * * * *